Patented May 28, 1946

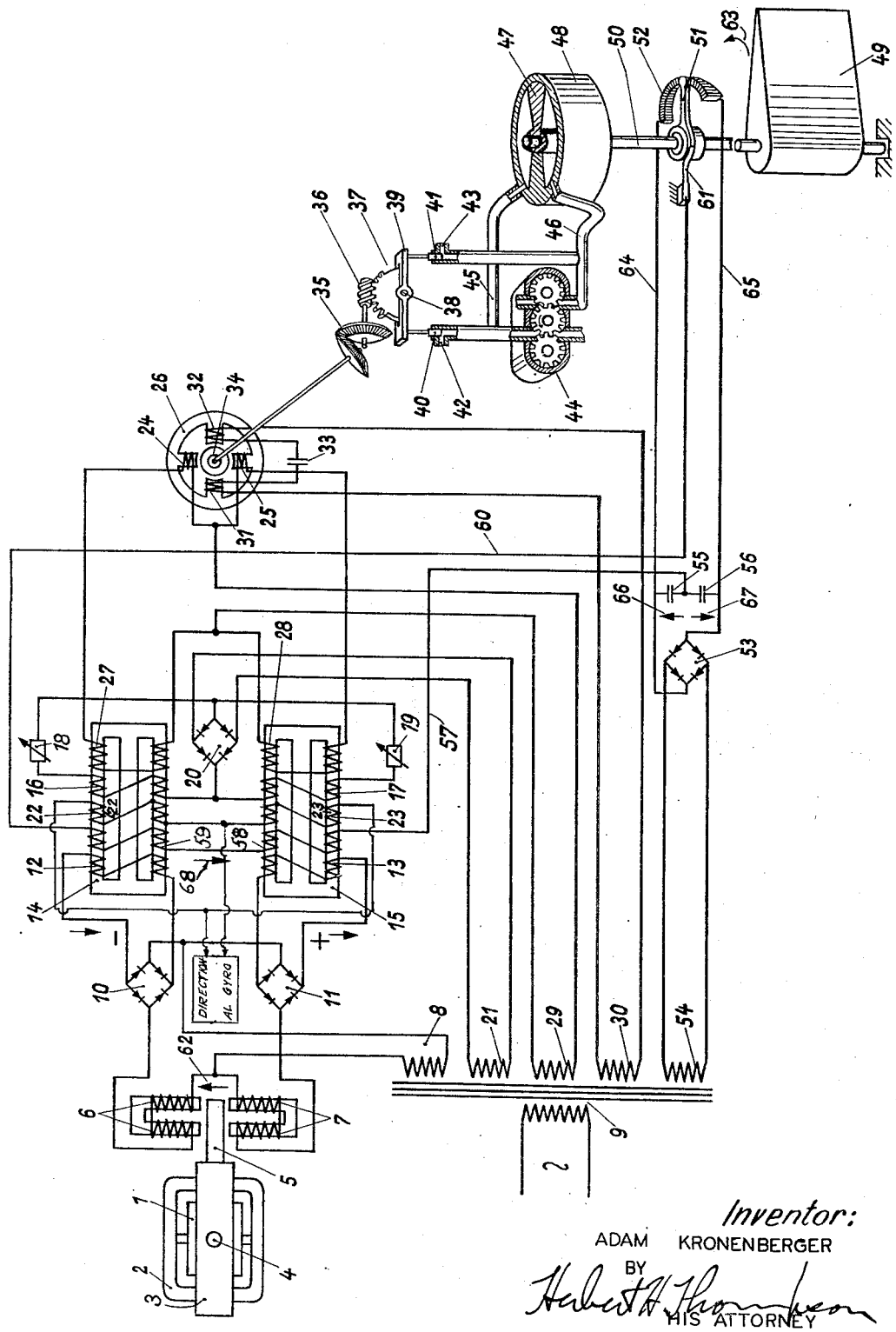

2,401,168

UNITED STATES PATENT OFFICE 2,401,168

AUTOMATIC STEERING DEVICE FOR AIRCRAFT

Adam Kronenberger, Berlin, Germany; vested in the Alien Property Custodian

Application November 27, 1940, Serial No. 367,329
In Germany November 23, 1939

10 Claims. (Cl. 244—77)

The invention relates to automatic steering devices for aircraft in which a directional transmitter controls a servo-motor through a relay. In systems of this kind the directional transmitter usually consists in a gyro instrument (as for instance a directional gyro or a gyro vertical) and in order to adequately dampen the movements of the craft, there are added to the basic control signal according to the respective requirements further control impulses dependent on the rotary speed or the rotary acceleration of the craft.

In order to obtain an effective control free from hunting it is essential that no material delay occur between the disturbing influence on the craft and the counteracting deflection of the control surfaces. Furthermore the control surface should be restored to its normal position as quickly as possible after the disturbance has been compensated for. It is therefore necessary in the first place to avoid any lag in the control apparatus causing the deflections of the control surfaces, for which reason it is advantageous to use a hydraulic servo-motor having comparatively small mass and operating substantially without delay.

The action of restoring the control surface to its normal position when the control signal dies down to zero can be accelerated by replacing the aircraft steering devices in common use by a steering gear which is yieldingly opposed by the exterior forces acting upon the control surface. Such an arrangement may be obtained for instance by the throttling of one of two pressure fluid streams which are carried to either side of the servo-motor prior to passing through the throttling orifices, the particular stream corresponding to the desired sense of control surface displacement. In such a controlling device a state of balance is established between the relative wind acting upon the control surface and the liquid pressure supplied to the servo-motor in response to the steering signal derived from the controlling instruments. When the steering signal becomes zero the deflection of the control surface becomes zero likewise without the necessity of reversing the servo-motor, as would be the case in self-locking steering systems. In order to maintain such deflection of the control surface as is necessary for overcoming the disturbance, a constant liquid pressure will, however, be required in such a yielding control system in the case of a constant disturbance of the balance of the craft due, for instance, to failure of one lateral motor. Therefore according to the invention I use a servo-motor yielding against external forces acting on the control surfaces in combination with an unrestrained relay, the speed of movement of which is dependent upon the amount of the control signals. When a disturbance occurs, the relay is brought to the position necessary for the elimination of such disturbance, whereby a certain liquid pressure and a corresponding deflection of the control surface are produced. This deflection is maintained even after the craft has attained the desired position and the initial control signal has become zero with the result that a torque balancing the disturbing moment is constantly exerted on the craft. This deflection of the control surfaces is maintained until the constant disturbance has been eliminated and is then nullified by means of a countercontrol signal restoring the relay to its middle position. The returning of the control surface is caused by the relative wind while the servo-motor is only relieved of the control pressure. In a self-locking steering system, on the other hand, a countercontrol is required for returning the control surface to its middle position, as in this case the restoring force of the relative wind is not utilized. The reversal of a rudder motor and rudder takes considerably longer than the reversal of a relay, which is of light construction and thus controllable at a corresponding high velocity. Another advantage in the use of a resilient servo-motor is that it requires but little driving power whilst the control surface is in its middle position, while the self-locking hydraulic devices commonly used run constantly under full load.

A Ferraris or two-phase induction motor may advantageously be used as a relay as it is readily reversible due to the small mass of its armature. In order to avoid over-control, the motor revolutions may be limited by an impulse derived from the velocity of the control surface. This can be achieved by means of a contact brush sliding over a voltage divider connected to the output rod system of the servo-motor. The two branches of the voltage divider are connected with two condensers to form a Wheatstone bridge. By this means the compensating voltage resulting from the displacement of the sliding brush becomes an index of the velocity of the control surface. By transmitting this impulse after appropriate amplification to the relay, a force is opposed to the other control signals, and the deflection of the control surface is restricted.

The impulse may be amplified by means of a magnetic or saturable coil amplifier. A simple way of mixing the control signals is to provide the amplifier with several magnetizing windings, each winding being connected with one signal source.

Further details concerning the invention will be apparent from the following description of one embodiment of the invention.

The drawing represents schematically an automatic steering system in which the control signals act through a saturable magnetic amplifier upon a Ferraris motor serving to control a hydraulic servo system.

A gyroscope with two degrees of freedom acts as the controlling element to determine the rotary velocity and rotary acceleration of the craft about its vertical axis. The horizontal rotary axis of the gyro rotor 1 is supported in a frame 2, which is in turn rotatable in a gimbal ring 3 about a likewise horizontal axis which is vertical to the first axis. The gimbal ring is adapted to turn slightly about a vertical axis 4. In a manner not shown the gimbal ring 3 and the rotor carrier 2 are restrained in their middle position relative to the casing, the restraint being strong for the gimbal ring while it is comparatively slight for the rotor carrier. Thus the gyroscope may precess a fair amount about its horizontal axis at turns performed by the craft about its vertical axis, the movements being proportional to the turning speed, while a moment corresponding to the turn acceleration acts upon the gimbal ring to turn about its vertical axis 4. An armature 5 moving between two coils 6 and 7 is secured on the gimbal ring 3. According to the position of the armature 5 relative to the coils 6 and 7 the reluctance of the coils and hence their self-inductance is varied. Consequently the voltage supply through the winding 8 of a transformer 9 meets with corresponding differences in impedance with the result that different currents are produced in the windings 12, 13 of two magnetic amplifier coils 14, 15 connected via respective rectifiers 10, 11 to coils 6 and 7. Premagnetizing windings 16, 17 connected via variable resistors 18, 19 and a full-wave rectifier 20 with a winding 21 of the transformer 9 serve to adjust the most favorable operating point on the magnetization curve of the amplifier.

Two further magnetizing windings 22, 23 are mounted on the amplifier coils 14, 15 for transmitting the course deviation, said magnetizing windings being controlled, in a manner which need not be described, by means of a directional gyroscope, and pick-off shown diagrammatically. The control signals are mixed, amplified and supplied to a Ferraris motor 26 through control windings 24, 25. Windings 27, 28 communicating with the motor windings 24, 25 connect the exciting voltage supplied by the winding 29 of the transformer 9 to the amplifier coils. The exciting voltage for the Ferraris motor is supplied by a further transformer winding 30 connected to the corresponding motor windings 31 and 32. In order to obtain the necessary phase displacement, a condenser 33 is inserted in this circuit.

The armature 34 of the Ferraris motor 26 drives a worm 36 through a reduction gear 35, worm 36 engaging with a worm wheel 37. The latter is adjustable about its axis 38 and serves to control a rocker arm 39 of a hydraulic positioning device. Two small valve pistons 40, 41 are provided for alternate throttling of either one of outlet orifices 42, 43. The pressure fluid is circulated by means of an electrically driven three-gear pump 44. When the rocker arm 39 is inclined one of the outlets 42 or 43 is throttled, and pressure is created in the corresponding control line 45, or 46, respectively, whereby the vane 47 of a rotary piston 48 is set in motion causing a deflection of the rudder 49.

On a shaft 50 connecting the piston 48 with the control surface, a sliding brush 51 is mounted so as to be insulated from shaft 50. This brush slides over a voltage divider 52 which is mounted rigidly relative to the craft, and both ends of which communicate with the output end of a full-wave rectifier 53 energized from a winding 54 of the supply transformer 9. Two condensers 55, 56 are connected with the two branches of the voltage divider 52 so as to form a bridge circuit. A wire 57 branches off between the two condensers 55, 56, leading to a control winding 58 of the amplifier coil 15. A corresponding control winding 59 on the coil 14 is connected in series with winding 58 and communicates via a line 60 and a spring contact 61 with the tap 51 of the voltage divider 52.

In order to explain the mode of operation of the directional steering system let it be assumed that the craft is thrown out of its course by a gust of wind. To compensate for the disturbance it is necessary that the control surface be deflected to the right which is effected in the following manner: At a standstill of the steering rudder the resistors 18, 19 are set so as to produce a certain premagnetization resulting in the two amplifier chokes 14, 15 being each about half saturated so that the currents passing through the two control windings 24, 25 of the Ferraris motor 26 are equal and therefore balance one another. On account of the assumed turning of the craft to the left, the armature 5 executes a relative movement upwardly in the direction of the arrow 62, since the gyroscope 1, as a mass of great inertia tends to maintain its position in space. Thereby the impedance of the coil 7 decreases and the current in the control winding 13 of the lower coil 15 gains in strength while on the other hand the current in the winding 12 of the coil 14 decreases. The directional gyroscope acts in the same sense on the windings 22 and 23. Due to the increased magnetization of the coil 15, increasing its saturation and decreasing its impedance the current in the output winding 28 increases likewise so that it predominates over the decreasing current in the winding 27 of the other amplifier coil 14. Consequently the field of the control winding 25 of the Ferraris motor is stronger than that produced by the winding 24, and the armature 34 commences to turn with corresponding speed in a sense so as to cause an increase in pressure to be produced in the chamber of the servo-motor 48 fed by line 46, with the result that the control surface deflects to the right as indicated by the arrow 63. In this connection it is requisite that the rocker arm 39 be turned clockwise, whereby the cross section of the discharge orifice 43 is reduced and a pressure increase in the conduit 46 is produced.

The restoring system 51—61 provided for restricting the speed of the control surface 49 restricts the control impulse in the following manner:

While the control surface is moving in the direction indicated by the arrow 63, the voltage at the condenser 55 is reduced and that at the condenser 56 increased. Let it be assumed that the line 64 possesses a positive potential and the line 65 a negative potential. Then a compensating current is created upon the displacement of the brush 51 in the direction of the arrow 63, said current being in the direction of the arrows 66, 67. Thereby in turn a current is produced in the windings 58, 59 in the direction of the arrow 68. This current flows in a direction opposite to that of the current passing through the windings 12, 13 (as well as that in 22, 23). This current 68 has a magnitude corresponding to the speed of the control surface 49, and opposes the currents in windings 12, 13 and 22, 23 thereby causing the armature 34 of the motor 26 to come to rest.

The compensating current should be proportional to the rotary speed of the control surface. This is achieved by keeping the time constant of the compensating system sufficiently small by corresponding dimensioning of the condensers 55, 56 and of the respective resistors. Under these conditions the electric combination represents a differential system electrically reproducing the speed of the control surface. The compensating current flows only until the charges of the two capacities 55, 56 balance the voltages existing at the potentiometer 51, 52. (The charges of the condensers are of course given by the ratio of voltage to capacity.) When the control surface comes to a standstill the compensating process is practically terminated, so that there is then no current in the lines 57, 60.

In case the rocker arm 39 has not been fully deflected, the control surface comes to a standstill as soon as the control pressure in ducts 45, 46 and the relative wind acting on the control surface 49 balance. In a servo-motor system which is non-yielding relative to exterior forces it would be necessary for the motor 26 to reverse in order to cause the control surface to come to rest, as in this case the engine working pressure is constantly effective as long as the relay is deflected from its middle position.

It will thus be clear that the speed of motor 26 is controlled in accordance with three separate effects: (1) a combination of craft angular velocity and acceleration, applied differentially to windings 12, 13; (2) deviation of craft heading from a predetermined course, applied differentially to windings 22, 23, and (3) rudder angular velocity, applied differentially to windings 58, 59.

If a steady influence causes the craft to deviate from its pre-set heading, motor 26 will run to reposition valve 37 to thereby displace rudder 49 to steer back to the proper heading. Motor 26 will stop when the pre-set heading is reached, leaving valve 37 and rudder 49 displaced by the amount necessary to overcome the steady influence. If the influence disappears, the craft will turn slightly too far, reversing the signals and causing motor 26 to rotate in the reverse direction to thereby restore valve 37 to neutral and permit air pressure of the relative wind to restore rudder 49 to neutral.

What I claim is:

1. In an automatic steering device for aircraft, the combination of, a direction giving instrument having a pick-off, a relay free to move according to the signal received from said pick-off, the speed of movement being proportional to the strength of the signal, a servo-motor controlled by said relay and adapted to yield against external forces, a control surface connected to said servo-motor, means for deriving a control signal dependent upon the speed of corrective movement of said control surface by said servo-motor, and means responsive to said control signal for modifying the corrective action of said relay.

2. An automatic steering device for aircraft according to claim 1 wherein said relay is a Ferraris motor.

3. An automatic control device for aircraft having a control surface mounted to be movable in response to the pressure of the relative wind thereon, comprising means for producing a signal corresponding to deviation of said craft from a predetermined attitude, means including a control valve for producing a differential pressure, means for producing a signal corresponding to the speed of movement of said control surface relative to a previous position thereof, means for controlling the position of said valve by said two signals, and means responsive to said pressure for displacing said control surface to a position where said pressure is balanced by the relative wind pressure on said surface.

4. An automatic control device for aircraft as in claim 3, further comprising means for producing a third signal corresponding to the velocity and acceleration of the deviation of the aircraft from said attitude and responsive to the speed of displacement of the control surface resulting from the operation of said means and of the pressure of the relative wind thereon and means for combining said third signal with said other signals to jointly control said valve.

5. An automatic control device for aircraft having a control surface yieldable to the pressure of the relative wind thereon, said device comprising means for producing a signal corresponding to deviation of said aircraft from a predetermined attitude, means for producing a second signal corresponding to the velocity and acceleration of said deviation, means including a control valve for producing a differential pressure, motive means for changing the position of said valve, control means including a saturable magnetic device for controlling said motive means by said signals, and means responsive to said differential pressure for displacing said control surface, and means for producing a third signal corresponding to the speed of displacement of said control surface and modifying the action of said control means whereby said control surface is moved to a position in which the relative wind pressure on said control surface and the differential pressure thereon are in balance.

6. An automatic control device as in claim 5, wherein said motive means comprises a Ferraris motor.

7. An automatic control device for aircraft having a control surface which is adapted to be moved and thereby exert a control effect, means for producing a first signal corresponding to the deviation of said craft from a predetermined attitude, motive means operatively connected to move said control surface with respect to the craft in response to said signal, control means responsive to said first signal for determining the speed at which said control surface is moved by said motive means, said control means including a control valve and operating means for controlling the position of said valve, means responsive to the action of said control valve for controlling the operation of said motive means whereby said control surface takes a position depending upon the pressure of fluid flowing through said control valve and the pressure of the relative wind thereon, means for producing a second signal corresponding to the speed at which said control surface is moved by said motive means, and means operated by said second signal for modifying said position of the control surface whereby hunting by said aircraft about said predetermined attitude is prevented.

8. An automatic control device for aircraft comprising, a control surface adapted to be moved to exert a control effect upon the aircraft, means for producing a first signal corresponding to deviation of said craft from a predetermined attitude, fluid control means including a control valve for producing a differential fluid pressure, motive means for controlling the position of said control valve, means for controlling the operation of said motive means in response to said first signal, means responsive to said differential fluid pressure for displacing said control surface to a position of balance between said control pressure and the relative wind pressure on said control surface, means for producing a second signal corresponding to the speed at which said control surface is displaced toward the balanced position, and means for combining the effect of the first named signal and the effect of said second signal whereby hunting of said aircraft about said predetermined attitude is prevented.

9. In an automatic control device for aircraft, a control surface which is moved to control the flight of the aircraft, means responsive to a control effect desired to move said control surface, and means to exert an opposing effect upon said last named means to prevent hunting comprising, a pair of condensers connected in series, a potentiometer unit comprising a resistance and a conductor moving therealong, said resistance unit being connected in parallel with said condensers across a source of direct current circuit means connecting the juncture of said condensers with said conductor whereby current flows between said conductor and said juncture upon the movement of said conductor along said resistance unit, and means connecting said conductor to be moved when said control surface is moved to exert a control effect upon the aircraft.

10. An automatic control device for aircraft having a control surface, comprising means for producing a signal corresponding to deviation of said aircraft from a predetermined attitude, means for producing a second signal corresponding to the velocity and acceleration of said deviation, means for producing a third signal corresponding to the speed of said control surface, means including a control valve for producing a differential pressure, motive means for controlling the position of said valve, control means including a saturable magnetic device for controlling said motive means by all said signals, and means responsive to said differential pressure for displacing said control surface to a position whereat said differential pressure is balanced by the pressure of the relative wind on said control surface, said third signal producing means comprising a potentiometer, a cooperating sliding contact connected to move with said control surface, two condensers connected with said potentiometer to form a Wheatstone bridge circuit, means for energizing one diagonal of said bridge circuit from a source of direct current, and means for connecting the other diagonal of said circuit to said saturable device.

ADAM KRONENBERGER.